Aug. 5, 1969　　　J. L. BERG　　　3,459,296
RECEPTACLE AND SUPPORT FOR FROZEN CONFECTION
Filed Oct. 20, 1967
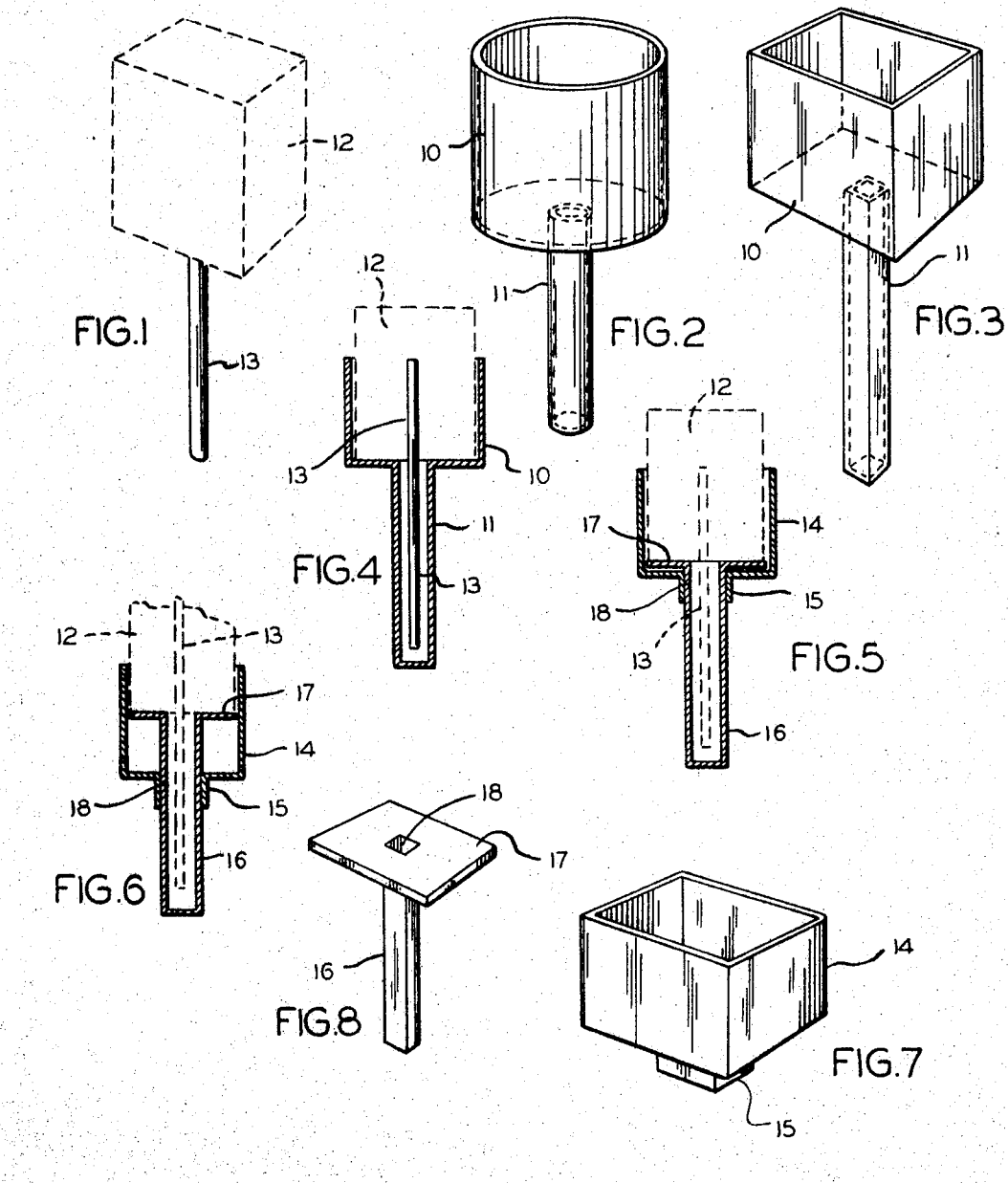
INVENTOR
JEAN LEROY BERG
BY Irwin C. Alter
ATTORNEY

United States Patent Office 3,459,296
Patented Aug. 5, 1969

3,459,296
RECEPTACLE AND SUPPORT FOR FROZEN
CONFECTION
Jean Leroy Berg, 1632 S. 94th St.,
West Allis, Wis. 53214
Filed Oct. 20, 1967, Ser. No. 676,918
Int. Cl. B65d 83/00
U.S. Cl. 206—56                                    2 Claims

ABSTRACT OF THE DISCLOSURE

A container for a portion of iced confection that can be exposed for eating. The container comprises an open ended body portion conforming to the shape of the confection and a bottom having an opening therein and a plate adjacent to the bottom having a hollow tubular handle extended through the opening in the bottom of the body portion.

---

My invention relates to a container for a portion of frozen confection or the like supported on a stick.

The prime object of my invention is to provide a container for frozen confection to be utilized while it is being consumed.

Another object of my invention is to provide a device of the character described that may be designed to slidably project the consumable product upward, where it is made more accessible to the user.

Still another object of the invention is to provide a product that may be constructed of permanent, or disposable material.

It is simple in construction, economical to manufacture, yet easy to manipulate when in use.

It is manifest to anyone familiar with the art that frozen confection or the like on sticks are a very popular type of consumable product, especially among the younger folks. It is also manifest that while the confection such as ice cream or the like is being consumed there is a constant hazard of it dripping and presenting a "messy" mass, and it is the prime object of my invention to provide a container or receptacle for the iced confection or the like which may be constructed in any form, shape, or contour.

Other and further objects of my invention will become more apparent as the description proceeds, when taken in conjunction with the drawings, in which:

FIGURE 1 is a perspective view of a conventional consumable product which includes a frozen confection, supported by a stick acting as a handle.

FIGURE 2 is a perspective view of an integral unit constituting my invention, and shown with a cylindrical design.

FIGURE 3 is a similar view as shown in FIG. 2, but of a cubical contour.

FIGURE 4 is a vertical cross-sectional view of the device as shown in FIGS. 2 and 3.

FIGURE 5 is a vertical cross-sectional view of a modified construction in which the handle portion slidably engages the body portion of the device, and showing the consumable product in phantom in a downward position.

FIGURE 6 is a similar view as shown in FIG. 5 with the handle portion in a raised position while the consumable product is being consumed.

FIGURE 7 is a perspective view of the body portion of the device as shown in FIGS. 5 and 6, and FIGURE 8 is a perspective view of the handle portion of the device shown in FIGS. 5 and 6, illustrating a plate for forcing the consumable product upward when the handle is pushed upward.

Similar characters of reference indicate corresponding parts and features, throughout the several views, and referring now to the same, the character 10 shows a container forming the body of the device. This body may be of any form, shape, or contour and is constructed of any type of material such as plastic and may be either a permanent or a disposable product.

The body 10 is equipped with an integral tubular handle (see FIGS. 2 and 3) shown as 11 which is sealed at its lower end.

The frozen confection 12 of the ice cream or the like is shown in FIG. 1 applied onto a stem 13 for its support while being consumed. The entire assembly consisting of the frozen confection 12 mounted onto the stem 13 is disposed into the body 10 with the stem 13 extending into the tubular handle 11 to prevent the ice cream or the like constituting the frozen confection 12 from dripping while it is being consumed.

In FIGS. 3 and 4, I show a modified construction in which the body 14 is provided with a flanged opening 15 to accommodate a tubular handle 16 sealed at its lower end and having a plate 17 integrally mounted to its upper end, the plate 17 having an opening 18 centrally disposed to accommodate the stem 13 of the assembly.

The FIGS. 5 and 6 show the purpose of the body 14 which obviously may be of any shape or contour provided with the flanged opening 15 to accommodate the tubular handle 16 so when the handle is forced upward as shown in FIG. 6, the plate 17, which fits the contour of the body 14 (see FIG. 6), will force the frozen confection 12 such as ice cream or the like upward to enable the user to have access thereto.

From the above description, it will become apparent that the device is designed to perform perfectly for the purpose for which it is intended, and although I have shown a specific construction and arrangement of the parts and features constituting my invention, I am fully cognizant of the fact that many changes may be made in the parts and their arrangement without affecting their operation, and I reserve the rights to make such changes without departing from the spirit of my invention.

Having thus described my invention, what I claim and desire to secure by Letters Patent in the United States is:

1. A container for frozen food confection that is frozen around a stem, comprising:
   a body portion conforming to the cross-sectional contour of said frozen confection,
   said body portion having an opening at the bottom thereof,
   a handle portion,
   said handle portion comprising a plate shaped to contact the lower portion of said confection,
   said plate having an opening formed therein,
   a hollow tubular handle attached to the bottom of said plate and communicating with said opening whereby said stem can be received by said tubular handle and said plate can support said frozen confection for eating purposes, and said tubular handle shaped to slidably fit within the opening at the bottom of said body portion whereby said confection can be moved upward to enable exposure and eating thereof.

2. A container, as defined in claim 1, wherein a flange means depends from said opening in the bottom of said body portion in order that said tubular member can be guided for slidable movement therethrough.

References Cited

UNITED STATES PATENTS

| 1,668,960 | 5/1928 | Grimmeisen | 206—56 |
| 2,162,224 | 6/1939 | Legge | 206—56 |
| 2,166,619 | 7/1939 | Becker | 206—56 |
| 2,759,831 | 8/1956 | Young et al. | 99—137 |

WILLIAM T. DIXSON, Jr., Primary Examiner

U.S. Cl. X.R.

99—137